Figure 1:
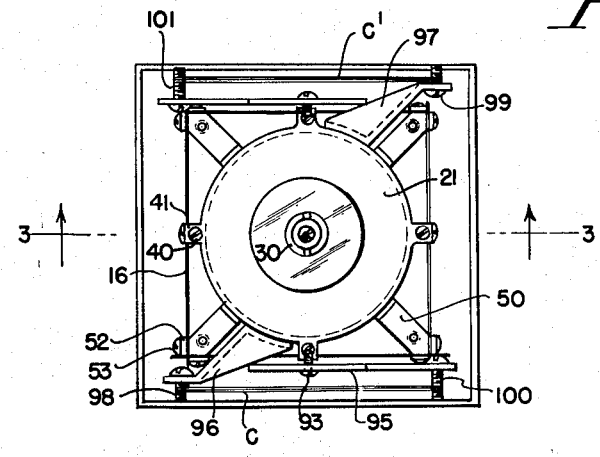

May 22, 1956   H. W. HENDERSON   2,746,301
GYROSCOPIC DEVICES

Filed Jan. 2, 1953   2 Sheets-Sheet 1

INVENTOR
HAYWARD W. HENDERSON
BY
George H. Fisher
ATTORNEY

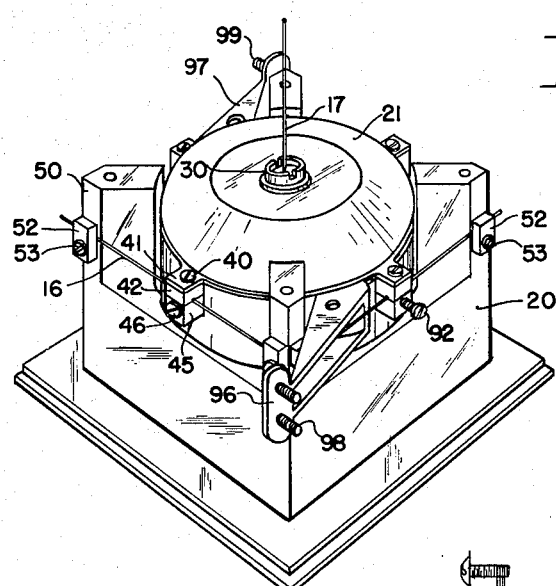
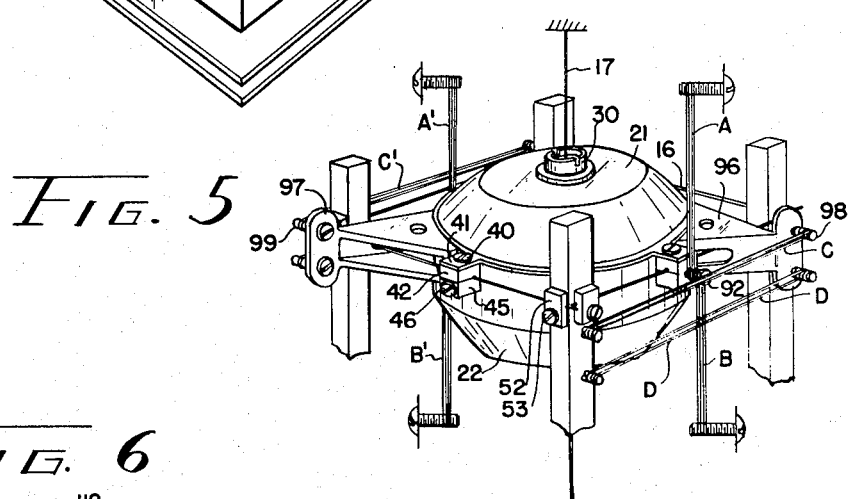
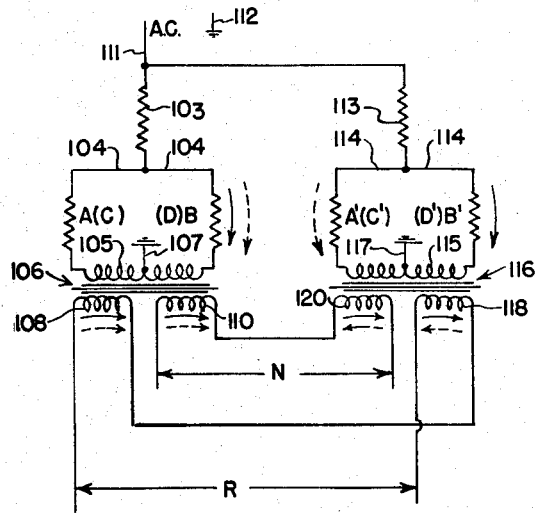
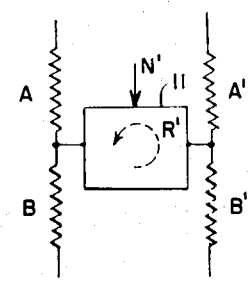
INVENTOR
HAYWARD W. HENDERSON
BY George H Fisher
ATTORNEY United States Patent Office 2,746,301
Patented May 22, 1956

2,746,301

GYROSCOPIC DEVICES

Hayward W. Henderson, Minneapolis, Minn., assignor to Minneapolis-Honeywell Regulator Company, Minneapolis, Minn., a corporation of Delaware Application January 2, 1953, Serial No. 329,335

15 Claims. (Cl. 74—5.6)

My invention relates to gyroscopes and more particularly to an improved type of rate measuring gyroscope which does the work of two single axis rate gyroscopes and measures acceleration along an axis normal to the input axes of the device with a single rotating wheel.

The improved gyroscopic device of the subject invention combines the structure and operation of two rate gyroscopes in a single device eliminating conventional gimbal structure and combining a gyro wheel support with restraint to define a pair of axes perpendicular to one another and about which the gyro mass is capable of being displaced. The structure also provides for utilizing the rotor mass for displacement along its spin axis to sense acceleration in this direction. The mounting of the gyroscope further eliminates gimbal bearing structures and consequent frictional errors, thereby increasing the sensitivity of the device. Because of the simplicity of this structure, it can be fabricated with a minimum of parts and a minimum of mass to effect a compact yet simple design. The use of the combined mounting and restraining structure for the single gyro wheel in addition to providing for low threshold and high sensitivity in the gyroscope also provides for high rate outputs from the device which have a high natural frequency.

My improved gyroscope design also utilizes the elastic type sensing element having electrical characteristics which vary with tension and consequently further eliminates the possible frictions which might be introduced by relatively rotating parts or the interaction of electromagnetic torques between portions of conventional sensing and signalling devices. This type of a signal producing device also eliminates much of the size and weight of the conventional control apparatus normally applied to gyroscopes for signalling purposes.

It is therefore an object of this invention to provide an improved type of rate gyroscope apparatus.

It is also an object of this invention to provide a rate gyroscope apparatus in which rate signal may be obtained for torques applied about a pair of perpendicular axes.

It is further an object of this invention to provide a rate gyroscope device which with a single rotating mass is capable of simultaneously sensing rates of displacement about a pair of axes and acceleration along a third axes.

It is also an object of this invention to provide in a rate gyroscope design an arrangement of parts which eliminates frictional errors, permits increased sensitivity and operates at higher natural frequencies.

A still further object of this invention is to provide in a rate gyroscope design of the type described a structure which is compact, simple in design, and economical to manufacture.

Figure 2:
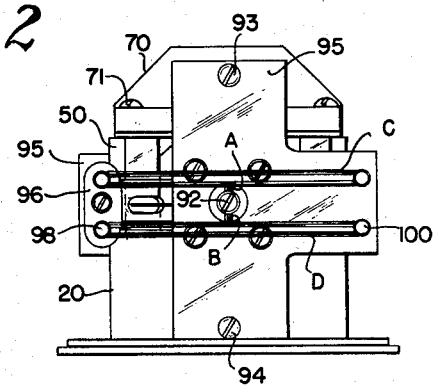
Figure 3:
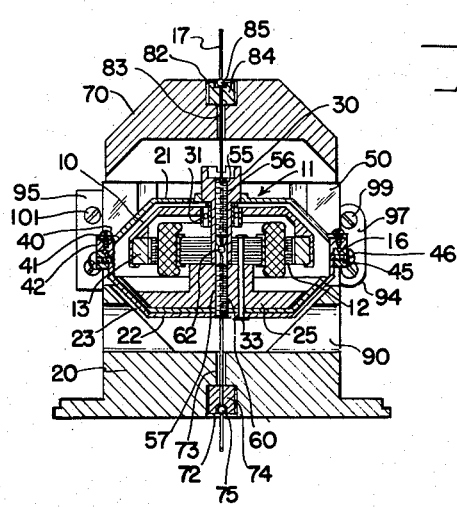

These and other objects of this invention will become apparents from a reading of the attached description together with the drawings wherein:

Figure 1 is a plan view of the gyroscope with a top portion of the frame removed, Figure 2 is a side elevation view of the gyroscope with the top portion of the frame in place, Figure 3 is a sectional view of the gyroscope taken along the line 3—3 of Figure 1, Figure 4 is a perspective view of the gyroscope with a top portion of the frame and the sensing elements removed, Figure 5 is a schematic view in perspective of the gyroscope with the sensing elements included, Figure 6 is a wiring diagram for two pairs of the strained elements or sensing devices of the subject gyroscope for one axis of displacement, and Figure 7 is a schematic disclosure of the gyroscope with two pairs of the sensing elements attached to disclose the operation of the same.

My improved gyroscope design includes a rotor mass 10 housed and journaled in a rotor casing 11 and driven by a spin motor comprising a stator 12 and a rotor 13. The casing 11 is supported through a plurality of elastic members or wires 16, 17 on a frame 20 of the gyroscope. The relationship between the rotor mass 10, the casing 11, the supporting wires 16 and 17, and the frame 20 together with their operation will become evident as this disclosure proceeds. Referring specifically to Figure 3, it will be seen that the casing 11 is comprised of two parts 21 and 22 which are upper and lower portions respectively and fit together to form the sealed unit having a cylindrical opening 23 therein. Mounted on the lower case member 22 through suitable means not shown is a bracket 25 which in turn mounts the stator 12 of the spin motor. Extending through the upper portion 21 of the casing 11 and attached thereto by suitable means not shown is a sleeve 30 upon which is mounted bearing means 31, the inner race of which is securely attached to this sleeve 30 and the outer race of which mounts the rotor mass 10 which is cup shaped in form and carries the spin motor rotor 13 at its periphery. The squirrel cage rotor element 13 which is mounted on the rotor mass 10 is positioned in proximity with stator 12 with suitable clearance therebetween such that the magnetic flux of the stator may cooperate with the squirrel cage element to drive the rotor mass on the sleeve 30 and relative to the stator 12. Electrical connections to the spin motor which is shown herein as a conventional induction motor are omitted for simplicity, it being understood that they could thread into the casing 11 through a suitable channel or aperture such as is indicated at 33. Further the mounting of the stator on the bracket 25 is omitted herein, it being understood that any suitable means may be used to attach the stator securely to the bracket.

The upper and lower portions 21 and 22 of casing member 11 are held together by a suitable screw means 40 which extend through flanges 41 and 42 respectively on the upper and lower portions 21 and 22. Reference to Figures 1, 4, and 5 will indicate that such flanges appear on the upper and lower casing members at the diammetrically opposed points. The flange portion 42 of the lower casing member further cooperates with an additional bracket 45 to clamp the wires 16 to these points on the casing member. The bracket 45 is held in position by a screw 46 threaded through the bracket 45 and into the casing member 22. The bracket 45 and flange 42 serve to attach the wires 16 at their midpoint and the extremities of the wires are connected to upstanding portions 50 of a frame 20 being secured thereto by similar brackets 52 which are held in position by screw means 53. Thus the casing member is supported on the upstanding portions 50 of the frame 20 through the wires 16 which serve as a gimbal structure to provide displacement axes mutually perpendicular to one another and perpendicular to the spin axis of the rotor.

The casing 11 with the rotor mass 10 and spinning means 12 and 13 therein is further supported in the direction of the spin axis by means of the wire 17 in the following manner. Through a tapped aperture 55 in the sleeve 30 of the upper casing member 21, there is threaded a hollow screw means 56 the opening of which is sufficient to loosely accommodate the wire 17. A similar tapped aperture 57 in the casing 22 and frame or support 25 houses a second screw means 60 which is also hollow having an aperture therethrough also large enough to accommodate the wire 17. Each of the screw means 56 and 60 have suitable tool receiving portions in the extremities thereof such that the screw means may be adjusted in the respective threaded apertures. The wire 17 has a collet 62 thereon which is positioned during assembly between respective screw means 60 and 56 as by sliding over each of the extremities of the wire 17. The screw means then are adjusted in their respective apertures until the collet is located substantially at the center of gravity of the casing with the rotor spinning means therein such that the point of support along the spin axis of the gyroscope will be substantially at the center of gravity of the device. The extremities of the wire 17 are connected respectively to the base 20 and a cover portion 70 which is positioned on the upstanding portions 50 of the frame 20 and secured thereto by suitable screw means 71. The base portion 20 has a tapped aperture 72 therein with a further aperture 73 leading from the tapped aperture 72 and through the base. One extremity of the wire 17 is passed through these apertures and a hollow slotted screw member 74 is threaded into the aperture 72, the wire 17 with a suitable fastening means such as a collet 75 thereon extending through the hollow screw 74 such that the wire 17 will be anchored at this point by the collet. A similar tapped aperture 82 in the upper portion 70 of the frame with a smaller aperture 83 permits the passage of the opposite extremity through wire 17 through this portion of the frame and the securing of the same to the upper portion of the frame 70 through a smiliar hollow slotted screw 84 which holds this extremity of the wire 17 through a collet 85. The wire 17 may be tensioned by adjusting the screws 74, 84 and the position of the casing 11 relative to frame 20 may be adjusted and secured. The wire 17 supports the rotor casing 11 with the rotor 10 and spin motor 12 and 13 therein for accelerations along the direction of the spin axis as will be evident as the disclosure proceeds. A large transversely extending aperture 90 through the base portion 20 permits inspection of the wire 17 from this point and also passage for the electrical wiring to the rotor casing. It will be understood that the displacement of the rotor casing 11 about the axes formed by the wires 16 and along the spin axis under the restraint of the wire 17 will be quite small consequently the clearances between the casing and the frame 20, and the upstanding portions 50 are quite small.

Inasmuch as the displacement of the gyroscope about its normal displacement axis and along the spin axis are very small, as indicated above, the associated sensing and signal producing means about a gyroscope must be capable of responding to such movements. In the subject gyroscope design it was found that elastic members whose electrical characteristics vary with tension, such as strain gauge elements, are satisfactory for this purpose. Reference to Figure 5 which discloses the gyroscope schematically in perspective without the frame and cover members or terminals will provide a clear showing of the location of the sensing and signalling elements and their relationship to the gyroscope mounting and displacement axes. Attached to two of the lower flange members 42 of the lower portion 22 of casing 11 are pins 92 which pins mount on one extremity four strain gauge elements in the manner shown in this figure. The opposite extremities of these strain gauge elements are mounted on similar pins 93, 94 which extend through a strain gauge mounting block 95 attached to the lower portion 20 and upper portion 70 or cover of the frame. Each strain gauge element is wound in the form of a loop or plurality of loops which are so secured to the respective pins that the material therein will be stretched or tensioned or relaxed by movement of the pins relative to one another. The strain gauge elements or wires are secured at their extremities to the pins such that lead wires may be connected thereto to form a circuit therethrough. While we have shown a plurality of turns of wire, it will be understood that the number of turns or loops will be determined by the desired resistance of the sensing elements and the strength of the same. As will be pointed out later in connection with the circuitry, the pairs of sensing members or strain gauges common to the same supporting pin will be connected in pairs in series connection. The strain gauge elements have been labeled in Figure 5 as A and B or A' and B' for one direction of displacement of the gyroscope. It will be readily perceived that the displacement of the gyroscope necessary to actuate the strain gauge elements will take place at the points of connection of the wires 16 and the casing 11, 90 degrees displaced from the pins 92.

Associated with the opposite displacement axis of the gyroscope or that defined by the connection between the wires 16 and the casing 11 at the flange members 42, which carry the pins 92, are the sensing elements C, D, C', D'. Casing 11 mounts a pair of brackets 96 and 97 which are attached to the lower portion 22 of the casing near this displacement axis of the gyroscope and extend outside of the upstanding portions 50 of the frame 20 and the periphery of the frame 20 which carry pins 98, 99 respectively thereon. The elastic and electrically responsive or strain gauge wire which is mounted on these pins extend also to pins 100 and 101 mounted on the strain gauge mounting blocks 95. These strain gauge elements C, D, C', D' extend between the pins 98, 100 and 99, 101 and are secured thereto in such manner that they will be tensioned or relaxed upon displacement of the arms 94, 95. The electrical connections from the strain gauge elements to a terminal board as well as the terminal board are omitted in the present disclosure for purposes of simplicity. Reference to Figure 6, however, will indicate the manner in which the strain gauge elements are connected to one another and their source of power.

In Figure 6 the wiring circuity for the strain gauge elements A, A', B, B', is disclosed. It will also be understood that the same circuity will apply for the strain gauge elements C, D, and C', D'. These elements are energized from a single phase A. C. source of power indicated by conductor 111 and a grounded supply terminal 112. The strain gauge elements A and B are connected to the conductor 111 through a voltage dropping resistor 103 which is connected to a conductor 104 common to one extremity of each of the strain gauge elements. The opposite extremity of the strain gauge elements A and B are connected to opposite extremities of a primary winding 105 of a transformer 106. The primary winding has a grounded center tap at 107. Transformer 106 includes a pair of secondary windings 108 and 110. Similarly the strain gauge elements A', B' are connected to the source of power at conductor 111 through a dropping resistor 113 which is connected to a conductor 114 and to one extremity of the elements A', B'. The opposite extremities of the elements A', B' are connected to opposite extremities of the same primary winding 115 of a transformer 116 which is center tapped at 117. Transformer 116 has secondary windings 118 and 120. As will be seen in Figure 6 the secondary windings 110 and 120 are connected in series additive relationship and the output across the same is indicated by a numeral N. Similarly the secondaries 108 and 118 are connected in a subtractive relationship and in series with their output indicated by a numeral R. Referring now to Figure 7 wherein is indicated a very schematic disclosure of the gyro casing with the strain gauges A, B, and A', B', attached. An arrow indicated by N' represents a downward thrust on the casing and inasmuch as the gyroscope or rotating mass within the casing acts only as a mass with respect to translations along the spin axis, the casing will be subjected to a downward movement against the restraint of the wires 16 and 17 and strain gauges A, A'. For the small motions allowed, the restraint of wires 16 is negligible. This will result in an extension or stretching of the elements A and A' and the slackening of the elements B, B'. It should be noted that all of the strain gauge elements when assembled are slightly tensioned in their normal position. Relaxation or slackening of the elements B, B' reduces the electrical resistance in these elements, and increasing the tension of elements A, A' tends to increase the resistance in these elements. Similarly a rotational force applied to the casing in a form of precession about the displacement axes located at 90 degrees from the positioning of the elements A, A', B, B' effects a slackening in opposite elements of each pair. Specifically rotation in the direction indicated in Figure 7 by arrow R' will tension or extend the elements A and B' and slacken elements B, and A'. A rotation in the opposite direction resulting from precessive movement in the opposite direction will tension and slacken diametrically opposed elements which will be different from that previously recited as will be evident from viewing the Figure 7. The circuitry applied to the strain gauge elements C, D, and C', D' is the same as that referred to in Figure 6 with the exception that the secondary windings 110 and 120 are omitted inasmuch as these strain gauge elements are not utilized to sense an acceleration. The schematic disclosure of Figure 7 would also apply for the strain gauge elements C, D, and C', D' even though the positioning of the elements and in their connection with the gyroscope is somewhat different than that of the first mentioned strain gauge elements. Upon viewing Figure 5 or Figures 1 through 4 it will be seen that the strain gauge elements C, D, and C', D' are attached to the gyro casing by means of the arms 94, 95. While these arms are physically attached to the gyroscope herein at points on the casing 11 about which the rotation will take place and about which the respective strain gauge elements are to sense rotation, it will be appreciated that this arrangement of parts will have the same effect upon tensioning or slackening the strain gauge elements if they were positioned 90 degrees displaced from the axis about which the rotation will take place. Specifically the gyroscope casing 11 will rotate or be subject to a rotational force about the axes defined by the connection of the members or brackets 22 having the pins 92 attached thereto. It will be appreciated that whenever the gyroscope rotates or is subjected to a rotational force about this axis, that the arms 96, 97 will pivot about this axis tending to stretch or tension one strain gauge element or slacken or relieve the tension on the opposite element connected to the same arm. Upon viewing Figure 5 and assuming a precessive movement or force in a clockwise direction as seen from the pin 92 in the foreground of the figure it will be appreciated the upper strain gauge element C will be stretched and D slackened and conversely the strain gauge element D' tensioned and C' slackened. For opposite directions of precessive movement or force as viewed from this same point, the strain gauge elements D will be tensioned, C slackened, C' tensioned, and D' slackened. It should be noted that gauges C, D and C' and D' could just as well be attached to the top and bottom of the casing 11 and are assembled in the particular manner disclosed above in the interest of minimizing size and to make possible a low threshold.

Considering the gyroscope as a unit it was appreciated that the gyroscoye will have two input axes responsive to rates of displacement thereof and will have a single axis, namely, the spin axis of which it is responsive to an acceleration. The input torques about the displacement axes of the gyroscope will be applied normal to the spin axis and normal to the axis about which the gyroscope precessive torque provides the output signals. Thus with the tilting of the frame of the gyroscope about an axis defined by one pair of connections between the casing and the supporting wires 16 precessive movement or force will occur about the opposite pair of connections between the casing and the supporting wires 16. This precessive movement or force will cause one or the other of the pairs of strain gauge elements to respond thereto. The input axis for the gyroscope for the second set of strain gauge measuring elements will be the axis in which the response occured for the input signal referred to previously inasmuch as the displacement axes of the gyroscope are normal to one another in a plane normal to the gyroscope spin axis. An acceleration applied to the casing along the spin axis of the gyroscope will result in tensioning of all of the supporting wires 16 and one half of wire 17 as well as the various strain gauge elements as will be further described hereinafter.

Assuming now in Figure 6 that an acceleration has been applied to the casing of the gyroscope as indicated by the arrow N' in Figure 7. This will result as previously indicated in tensioning of elements A and A' and slackening of elements B and B'. In Figure 6 this will be indicated by the solid arrows adjacent the elements B and B' representing the predominate current flow in this direction and hence an over-all result of energization of the primary windings 105 and 115 of transformers 106 and 116 in the particular direction or with a particular polarity. This polarity results in current flow in the windings 110 and 120 as indicated by the solid arrows resulting in an additive output which is indicated by the letter N representing the output resulting from an acceleration applied to the gyroscope. For this same current flow in the primary windings, the current flow indicated by the solid arrows in adjacent secondaries 108 and 118 will indicate that the resultant signal R or rate will be zero inasmuch as the signals will subtract. Consequently the rate output of the device will be zero and the acceleration output of the device will be the summation of the two signals. It will be appreciated that if the acceleration takes place in the opposite direction along the spin axis, the polarity of the resultant signal will be reversed from that indicated by the solid arrows but it will be additive in both transformer secondaries.

Considering now a displacement of the gyroscope about the input axes to which the strain gauge elements A, A', B and B' respond. Assuming that the precessive rotation or force of the casing 11 is as indicated by the dotted arrow R' in Figure 7 resulting in tensioning of the elements A and B' and slackening of elements B and A'. In Figure 6 this will be shown by the dotted arrows adjacent the elements B and A' and the dotted arrows adjacent the transformer secondaries 108, 110, 120 and 118. The overall effect of the predominate current flow through strain gauge element B will energize the transformer primary 105 and the current flow through element A' will energize the transformer primary 115 such that the rate outputs of the transformer secondaries 108 and 118 will be additive and the outputs of windings 110 and 120 will subtract to give a zero output. A reversal of the direction of precessive movement about this output axis will result in a displacement in phase 180 degrees for the output indicated at R from secondaries 108 and 118.

As previously indicated the same circuity is applied to the elements of C, D, and C', D' with the rate output being effected in the same manner. Depending upon the magnitude of rate and the acceleration signals, they may be used for performing a controlling function or may be amplified before they are used for controlling or indication purposes.

While I have described the inputs and resultant precessions or output signals of my device separately with respect to each of the gyroscope axes, it should be understood that the resultant precessional forces and signals may occur simultaneously for the displacement axes as well as the response to accelerations along the spin axis of the device.

It will be appreciated that this gyroscope could be positioned to respond to displacement about the roll and pitch axis of an aircraft in which case the spin axis of the gyroscope will be aligned with gravity and respond to normal acceleration applied thereto. However, the position of the gyroscope in an aircraft may be varied such that yaw rate signals and either roll or pitch rate signals together with lateral or longitudinal acceleration of the aircraft may be measured. Thus it will be seen that my improved gyroscope design produces simultaneously in a single device the function of two rate gyroscopes and an accelerometer. It will be understood that such measuring operation need not occur simultaneously for operation of the device and that the device will respond to any and all components of movement or accelerations applied thereto. It further utilizes elastic restraint means in both mounting and restraint in the rate gyroscope function.

While I have described my invention in connection with a specific disclosure it will be appreciated that certain changes may be made in the parts thereto without departing from the scope of the invention. Therefore I wish to limit it only by the appended claims.

I claim as my invention:

1. A gyroscope device comprising in combination, a rotatable mass and spinning means therefor, means mounting said mass for rotation about a spin axis, a frame member, elastic restraint means connected between said frame and said mounting means and suspending said mounting means for restrained pivotal movement about a pair of axes normal to one another and to said spin axis and for movement in a direction parallel to said spin axis, and means responsive to the movement of said mounting means about said pivotal mountings for producing a signal in proportion to said movement.

2. A gyroscope device comprising in combination, a rotatable mass and spinning means therefor, a casing means enclosing said mass and mounting it for rotation about a spin axis, a frame member, elastic restraint means connected between said frame and said casing means and suspending said casing means for restrained pivotal movement about a pair of axes normal to one another and to said spin axis and for movement in a direction parallel to said spin axis, and means responsive to the movement of said casing means about either of its pivotal axes or along its spin axis of said mass for producing a signal in proportion to said movement.

3. A gyroscope device comprising in combination, a rotatable mass and spinning means therefor, a casing means enclosing said mass and mounting it for rotation about a spin axis, a frame member, elastic restraint means connected between said frame member and said casing means and suspending said casing means for restrained pivotal movement about a pair of axes normal to one another and to said spin axis, and signal producing means connected between said casing and said frame member and responsive to movement of said casing means against said elastic restraint for producing a signal in proportion to the rate of said movement.

4. A gyroscope device comprising in combination, a rotatable mass and spinning means therefor, a casing enclosing said mass and said spinning means and mounting said mass for rotation about a spin axis, a frame member, two pair of elastic members each connected at their extremities to said frame member and at their midpoint to said casing and being disposed normal to said spin axis, said points of connection of said elastic members being at diametrically opposed points on said casing such that said casing is mounted for pivotal movement about a pair of mutually perpendicular axes normal to said spin axis, a first pair of strain gauges connected together at a common point and to said casing with their opposite extremities connected to said frame member such that said gauges are aligned and respond to displacement of said casing means about one of said mutually perpendicular axes, and a second pair of said strain gauges connected to said casing with their opposite extremities connected to said frame member such that said gauges respond to displacement of said casing means about the other of said mutually perpendicular axes.

5. A gyroscope device comprising in combination, a rotatable mass and spinning means therefor, a casing means enclosing said mass and said spinning means and mounting said mass for rotation about a spin axis, a frame member, two pair of elastic members each connected at their extremities to said frame member and at their midpoints to said casing means and being disposed normal to said spin axis, the points of connection of said elastic members being at diametrically opposed points on said casing means such that said casing means is mounted for restrained pivotal movement about a pair of mutually perpendicular axes normal to said spin axis, and signal producing means connected between said casing means and said frame member and responsive to movement of said casing means against said elastic restraint of said members for producing a signal in proportion to the rate of said movement.

6. A gyroscope device comprising in combination, a rotatable mass and spinning means therefor, a housing enclosing said mass and said spinning means and mounting said mass for rotation about said spin axis, a frame member, two pair of elastic members each connected at their extremities to said frame member and at their midpoints to said casing and being disposed normal to said spin axis in the same plane, the points of connection of said elastic members to said casing being at diametrically opposed points such that said casing is mounted for pivotal movement about a pair of mutually perpendicular axes normal to said spin axes, a first pair of elastic sensing members connected together at a common point and to said casing with their opposite extremities connected to said frame member, said elastic members being aligned when said casing is in a predetermined position and responding to displacement of the casing about one or the other of said mutually perpendicular axes, a pair of brackets mounted on said casing at diametrically opposed points and extending in opposite directions away from said casing, a second pair of elastic sensing members each connected respectively between said frame member and one of said brackets such that said elastic members respond to displacement of said casing above the other of said mutually perpendicular axes, said elastic sensing members having electrical characteristics which vary with tension applied thereto.

7. A gyroscope device comprising in combination, a rotatable mass and spinning means therefor, a housing enclosing said mass and said spinning means and mounting said mass for rotation about said spin axis, a frame member, two pair of elastic members each connected at their extremities to said frame member and at their midpoints to said casing and being disposed normal to said spin axis in the same plane, the points of connection of said elastic members to said casing being at diametrically opposed points such that said casing is mounted for pivotal movement about a pair of mutually perpendicular axes normal to said spin axes, additional elastic mounting means connected between said casing and said frame and aligned with said spin axis when said casing is in said predetermined position for resiliently mounting said casing for movement along said spin axis, a first pair of elastic sensing members connected together at a common point and to said casing with their opposite extremities connected to said frame member, said elastic members being aligned when said casing is in a predetermined position and responding to displacement of the casing about one or the other mutually perpendicular axes, a pair of brackets mounted on said casing at diametrically opposed points and extending in opposite directions away from said casing, a second pair of elastic sensing members each connected respectively between said frame member and one of said brackets such that said elastic members respond to displacement of said casing about the other of said mutually perpendicular axes, said elastic sensing members having electrical characteristics which vary with tension applied thereto.

8. A gyroscope device comprising in combination, a rotatable mass and spinning means therefor, a casing enclosing said mass and said spinning means and mounting said mass for rotation about a spin axis, a frame member, two pair of elastic members each connected at their extremities to said frame member and at their midpoint to said casing and being disposed normal to said spin axis, said points of connection of said elastic members being at diametrically opposed points on said casing such that said casing is mounted for pivotal movement about a pair of mutually perpendicular axes normal to said spin axis, two pair of strain gauges each pair of which are connected together at a common point and to said casing with their opposite extremities connected to said frame member such that the strain gauges of each pair are aligned when said casing means is in a predetermined position and respond to displacement of said casing means about one of said mutually perpendicular axes, and two additional pair of strain gauges each pair of which are connected to said casing with their opposite extremities connected to said frame member such that said strain gauges of each pair respond to displacement of said casing means about the other of said perpendicular axes.

9. A gyroscope device comprising in combination, a rotatable mass and spinning means therefor, a housing enclosing said mass and said spinning means and mounting said mass for rotation about said spin axis, a frame member, two pair of elastic members each connected at their extremities to said frame member and at their midpoints to said casing and being disposed normal to said spin axis in the same plane, said points of connection of said elastic members to said casing being at diametrically opposed points such that said casing is mounted for pivotal movement about a pair of mutually perpendicular axes normal to said spin axes, additional elastic mounting means connected between said casing and said frame and aligned with said spin axis when said casing is in said predetermined position for resiliently mounting said casing for movement along said spin axis, two pairs of elastic sensing members each pair of which are connected at a common point to said casing with their opposite extremities connected to said frame member such that said elastic sensing members are aligned when said casing is in a predetermined position and respond to displacement of said casing means about one of said mutually perpendicular axes, a pair of brackets mounted on said casing at diametrically opposed points extending in opposite directions away from said casing, and two additional pairs of elastic sensing means each pair of which is connected between said frame member and one of said brackets such that said elastic sensing members respond to displacement of said casing means about the other perpendicular axis, said elastic sensing members having electrical characteristics which vary with tension applied thereto.

10. A gyroscope device comprising in combination, a rotatable mass and spinning means therefor, a casing means enclosing said mass and said spinning means and mounting said mass for rotation about a spin axis, a frame member, two pairs of wires each connected at their extremities to said frame and at their midpoints to said casing means and being disposed in a plane normal to said spin axis, the points of connection of said wires being at diametrically opposed points on said casing means such that said casing means is mounted for restrained pivotal movement about a pair of mutually perpendicular axes normal to said spin axis, and signal producing means connected between said casing means and said frame member and responsive to movement of said casing means against said elastic restraint of said members for producing a signal in proportion to the rate of said movement.

11. A gyroscope device comprising in combination, a rotatable mass and spinning means therefor, a casing means enclosing said mass and said spinning means and mounting said mass for rotation about a spin axis, a frame member, two pair of wires each connected at their extremities to said frame and at their midpoints to said casing means and being disposed in a plane normal to said spin axis, the points of connection of said wires being at diametrically opposed points on said casing means such that said casing means is mounted for pivotal movement about a pair of mutually perpendicular axes normal to said spin axis, and two pair of elastic sensing means for each of said mutually perpendicular axes of said gyroscope, each of said elastic sensing means being connected between said casing means and said frame member and responsive to movement of said casing means against the restraint of said elastic means for producing a signal in proportion to the rate of said movement, said elastic sensing means having electrical characteristics which vary with tensions applied thereto.

12. A gyroscope device comprising in combination, a rotatable mass and spinning means therefor, a casing means enclosing said mass and said spinning means and mounting said mass for rotation about a spin axis, a frame member, two pair of elastic members each connected at their extremities to said frame and at their midpoints to said casing means and being disposed normal to said spin axis, the points of connection of said elastic members being at diametrically opposed points on said casing means such that said casing means is mounted for restrained pivotal movement about a pair of mutually perpendicular axes normal to said spin axis, said casing means further including an aperture therethrough coincident with said spin axis, an additional elastic member attached at its extremities to said frame member and positioned in said aperture of said casing means, means including said casing means attaching said additional elastic member at its midpoint to said casing, and signal producing means connected between said casing means and said frame member and responsive to movement of said casing means against said elastic restraint of said members for producing a signal in proportion to the rate of said movement.

13. A gyroscope device comprising in combination, a rotatable mass and spinning means therefor, a casing means enclosing said mass and said spinning means and mounting said mass for rotation about a spin axis, a frame member, two pair of elastic members each connected at their extremities to said frame and at their midpoints to said casing means and being disposed normal to said spin axis, the points of connection of said elastic members being at diametrically opposed points on said casing means such that said casing means is mounted for restrained pivotal movement about a pair of mutually perpendicular axes normal to said spin axis, said casing means further including an aperture therethrough coincident with said spin axis, an additional elastic member attached at its extremities to said frame member and positioned in said aperture of said casing means, means including said casing means attaching said additional elastic member at its midpoint to said casing, and two pair of elastic sensing means for each of said mutually perpendicular axes of said gyroscope, each of said elastic sensing means being connected between said casing means and said frame member and responsive to movement of said casing means against the restraint of said elastic members for producing a signal in proportion to the rate of said movement, said elastic sensing means having electrical characteristics which vary with tensions applied thereto.

14. A gyroscope device comprising in combination, a rotatable mass and spinning means therefor, a casing means enclosing said mass and said spinning means and mounting said mass for rotation about a spin axis, a frame member, two pair of elastic members each connected at their extremities to said frame and at their midpoints to said casing means and being disposed normal to said spin axis, the points of connection of said elastic members being at diametrically opposed points on said casing means such that said casing means is mounted for restrained pivotal movement about a pair of mutually perpendicular axes normal to said spin axis, said casing means further including an aperture therethrough coincident with said spin axis, an additional elastic member attached at its extremities to said frame member and positioned in said aperture of said casing means, means including said casing means attaching said additional elastic member to said casing, and a plurality of strain gauge elements each connected at one extremity to said frame and at the other extremity to said casing under tension and located about said frame and said casing in pairs such that one element of one pair is extended as the other element of the pair is relieved of tension when said gyroscope is tilted about one or the other of said mutually perpendicular axes.

15. A gyroscope device comprising a rotatable mass and spinning means therefor, means mounting said mass for rotation about a spin axis, a frame member, and elastic restraint means connected between said frame and said mounting means and suspending said mounting means for restrained pivotal movement about a pair of axes normal to one another and to said spin axis and for movement in a direction parallel to said spin axis.

References Cited in the file of this patent

UNITED STATES PATENTS

| | | |
|---|---|---|
| 1,226,882 | Henderson | May 22, 1917 |
| 1,743,533 | Davis | Jan. 14, 1930 |
| 2,511,178 | Roters | June 13, 1950 |
| 2,517,612 | Varian | Aug. 8, 1950 |
| 2,685,207 | Barkalow | Aug. 3, 1954 |